US010807006B1

(12) United States Patent
Davis et al.

(10) Patent No.: US 10,807,006 B1
(45) Date of Patent: Oct. 20, 2020

(54) BEHAVIOR-AWARE PLAYER SELECTION FOR MULTIPLAYER ELECTRONIC GAMES

(71) Applicant: Amazon Technologies, Inc., Seattle, WA (US)

(72) Inventors: Joshua Ryan Davis, Seattle, WA (US); Aleksey A. Polesskiy, Seattle, WA (US); Andrew Vladimirovich Temlyakov, Seattle, WA (US); Matthew Wuerffel, Bainbridge, WA (US)

(73) Assignee: Amazon Technologies, Inc., Seattle, WA (US)

( * ) Notice: Subject to any disclaimer, the term of this patent is extended or adjusted under 35 U.S.C. 154(b) by 55 days.

(21) Appl. No.: 15/833,903

(22) Filed: Dec. 6, 2017

(51) Int. Cl.
*A63F 13/795* (2014.01)
*A63F 13/798* (2014.01)
*A63F 13/30* (2014.01)
*A63F 13/847* (2014.01)

(52) U.S. Cl.
CPC .......... *A63F 13/798* (2014.09); *A63F 13/30* (2014.09); *A63F 13/795* (2014.09); *A63F 13/847* (2014.09); *A63F 2300/5566* (2013.01); *A63F 2300/575* (2013.01)

(58) Field of Classification Search
CPC ........ A63F 13/30; A63F 13/60; A63F 13/795; A63F 13/847; A63F 2300/5566; A63F 2300/575
See application file for complete search history.

(56) References Cited

U.S. PATENT DOCUMENTS

| 5,586,257 A * | 12/1996 | Perlman ................. A63F 13/12 463/42 |
| 6,128,660 A * | 10/2000 | Grimm ................. G06F 9/5027 463/42 |
| 6,352,479 B1 * | 3/2002 | Sparks, II .............. A63F 13/12 463/42 |
| 9,405,741 B1 * | 8/2016 | Schaaf .................... G10L 15/08 |
| 10,322,351 B2 * | 6/2019 | Marr ..................... A63F 13/795 |
| 2003/0227479 A1 * | 12/2003 | Mizrahi .................. A63F 13/10 715/753 |
| 2005/0170890 A1 * | 8/2005 | Rowe ...................... G07F 17/32 463/42 |
| 2005/0192097 A1 * | 9/2005 | Farnham ................ A63F 13/12 463/42 |
| 2006/0121990 A1 * | 6/2006 | O'Kelley, II ......... A63F 13/795 463/42 |

(Continued)

*Primary Examiner* — Steven J Hylinski
(74) *Attorney, Agent, or Firm* — Knobbe, Martens, Olson & Bear, LLP (57) ABSTRACT

Systems and methods are described for generating a multiplayer game session including a set of players with compatible preferences and behaviors. Each player can be associated with a set of behaviors exhibited by that player, as well as a set of preferences for those behaviors. On a request to initiate a game session, a first player can be paired with a set of other players whose behaviors are compatible with the preferences of the first player. Graph analysis may be used to facilitate selection of players. For example, each player may be represented as a node within a graph, and be connected to other nodes via an edge weighted according to a compatibility of preferences of the two players with their respective behaviors. In some instances, behaviors or preferences of players are determined based on analysis of in-game actions.

15 Claims, 6 Drawing Sheets

(56) References Cited

U.S. PATENT DOCUMENTS

| | | | |
|---|---|---|---|
| 2009/0325709 A1* | 12/2009 | Shi | G06Q 10/101 |
| | | | 463/42 |
| 2011/0151953 A1* | 6/2011 | Kim | A63F 13/79 |
| | | | 463/1 |
| 2012/0094762 A1* | 4/2012 | Khan | G06Q 10/101 |
| | | | 463/42 |
| 2012/0142429 A1* | 6/2012 | Muller | A63F 13/45 |
| | | | 463/42 |
| 2014/0025732 A1* | 1/2014 | Lin | H04L 67/306 |
| | | | 709/204 |
| 2016/0001181 A1* | 1/2016 | Marr | A63F 13/30 |
| | | | 463/42 |
| 2018/0111051 A1* | 4/2018 | Xue | A63F 13/795 |
| 2019/0091581 A1* | 3/2019 | Reiche, III | A63F 13/795 |

* cited by examiner

BEHAVIOR-AWARE PLAYER SELECTION FOR MULTIPLAYER ELECTRONIC GAMES

BACKGROUND

Users are increasingly playing electronic games in a networked context, allowing for multiple players to join a game session. Conventional multiplayer games select players for a particular session from a pool of available players, with the selected players having a similar rank or skill level. While such an approach can have advantages, as a player can play with other players of similar skill level even as the player's skill level changes, the player will frequently be matched with players who are unfamiliar to the player. Such an approach can make it difficult for a player to connect with the other players or develop camaraderie amongst the players. Further, being constantly matched with different players can prevent the player from learning to work as a team and balance out the strengths and weaknesses of other players.

DETAILED DESCRIPTION

Generally described, aspects of the present disclosure relate to generating sessions of a multiplayer electronic game, or other multi-user sessions of an electronic service. Traditional matchmaking for electronic games operates naively, focusing on relatively few characteristics of players in order to group players into a session. For example, traditional matchmaking may focus on grouping players based on skill level. While players may enjoy competing with others of a similar skill level, such systems naively assume that skill is the primary or only factor to players' enjoyment. Contrary to this assumption, players' enjoyment may depend heavily based on behaviors of other users with which they are paired, such as the proclivity of other players to use profanity or engage in other undesirable behaviors. Players who engage in such behaviors may be labeled as "toxic" by other players. One mechanism for dealing with such players is to isolate all "toxic" players into a separate player pool, such that one toxic player is paired only with other toxic players. However, assumption that all players are either "toxic" or "non-toxic" ignores important differences in player preferences, which may demonstrate the difficulty in arriving at a uniform definition of "toxic." For example, a first player (such as a parent of small children) may view profanity as toxic, but see no issue with leaving a game session prior to completion. Another player may see no issue with profanity, but feel strongly that leaving a game session prior to completion is "toxic" or undesirable behavior. Thus, an attempt to categorize players as either "toxic" or "non-toxic" may lead to difficulties in implementation. To address this issue, the present disclosure enables grouping of players for an electronic game session based at least partly on behaviors exhibited by those players, as well as preferences of the players for those behaviors. Illustratively, each player may be associated with a set of preferences for various behaviors, such as use of profanity or style of gameplay (e.g., characters played, actions taken in-game, tendency to complete a session, etc.), as well as preferences for such behaviors (e.g., strength of preference for or against the behaviors). Each pair of players may be associated with an affinity for one another, which may be based on a comparison of each player's preferences for behaviors of the other player. Players may be grouped together based on common affinities, thus creating groups in which players are likely to enjoy the behaviors of other players within the group. In some embodiments, graph analysis may be utilized to determine affinities between players. For example, each player may be represented as a node within a graph, and edges between nodes may be weighted according to affinities between nodes. Thereafter, the graph may be traversed to a group of players with sufficient affinity (e.g., over a threshold value) to be placed into a common game session. This behavior-aware player selection, used either independently or in conjunction with other techniques (such as skill-based pairing) may address problems with prior techniques, such as those described above.

The foregoing aspects and many of the attendant advantages of this disclosure will become more readily appreciated as the same become better understood by reference to the following description, when taken in conjunction with the accompanying drawings.

Figure 1:
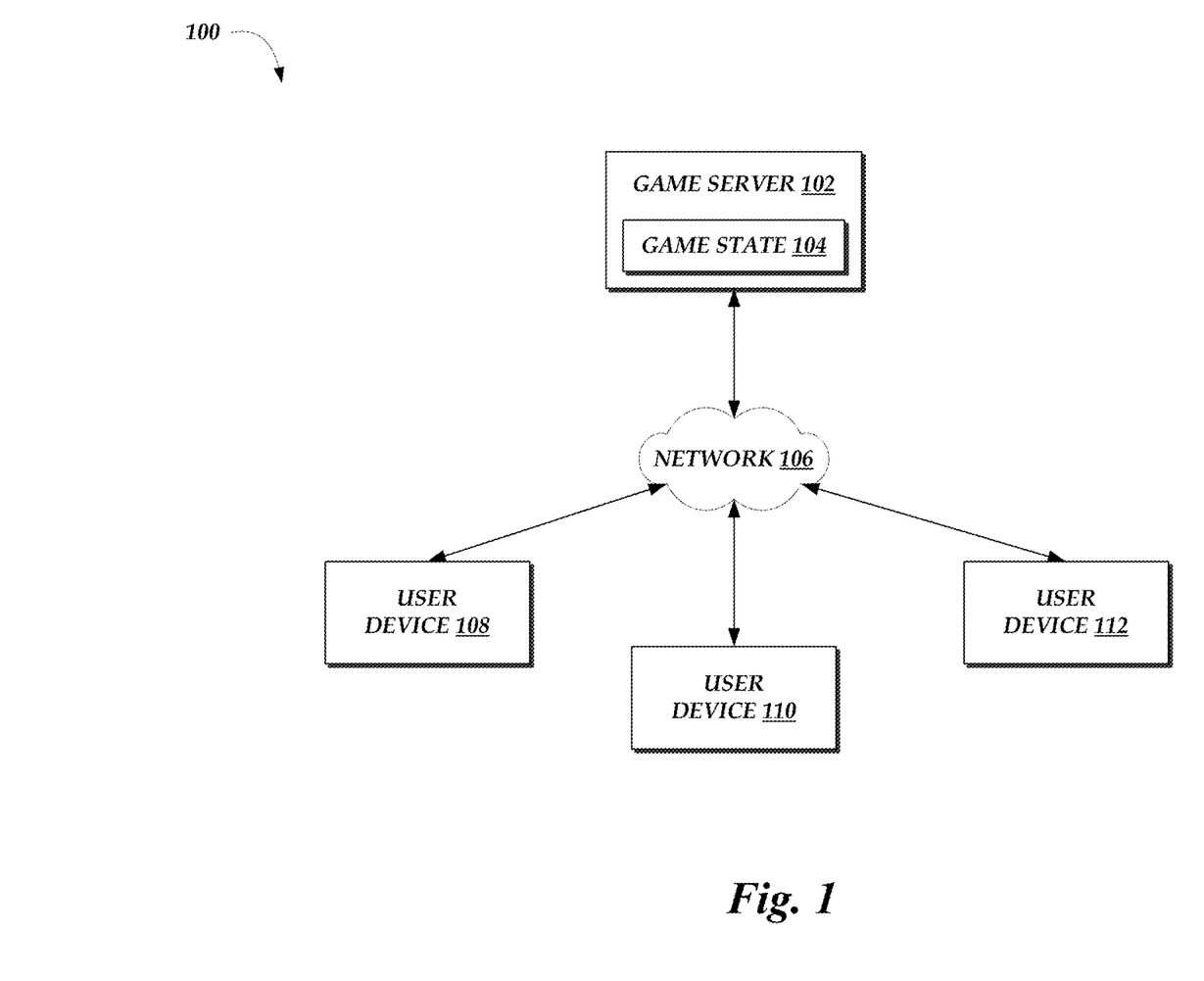
FIG. 1 illustrates an environment in which user devices may be used by players to access a game server hosting a multiplayer gaming session, for which players can be selected in accordance with embodiments of the present disclosure.

FIG. 1 illustrates an example gaming configuration 100 that can be managed in accordance with various embodiments. In this example, a gaming application is hosted on at least one game server 102. The game server 102 can be a local gaming machine or a remote server operated by a game provider, among other such options. In this example the game offers multiplayer capability, whereby multiple players can utilize respective devices 108, 110, 112 to connect to the game server 102 over at least one network 106, such as the Internet, a local area network, a dedicated gaming network, a peer-to-peer network, or a cellular network, among other such options and combinations thereof. The players can join in a session of the game with state data that is managed by a game state component 104 of the game server. In some embodiments, one or more game servers 102 can execute the game, while in others the servers can manage game state for instances of the game executing on the various player devices 108, 110, 112. These devices can include specific gaming devices, such as gaming consoles or handheld consoles, or other computing devices such as smart phones, tablet computers, wearable computers (e.g., smart glasses or watches), desktop or notebook computers, and the like. State information can be transmitted to the gaming server 102 at appropriate times, such as periodically, in response to certain actions or occurrences in the game, in response to requests from the server, or at other appropriate times. The game server can maintain the state information such that the game state is consistent across the various devices, as well as to enable a saving or restoring of the game for any or all of the devices.

In many instances, the game server 102 may enable players to submit a request to join a session of a specified gaming application supported by the game server 102. If there is an existing game session for which the player qualifies, such as by having an appropriate skill level or qualification, then the player can be added to the existing game session. If there is no existing game session for which the player qualifies, or if games can only be joined before the session starts, then the request can trigger the initiation of a new session for the game. In some embodiments, the new session can begin immediately, while in other embodiments or for specific games there might need to be a specified number, minimum number, or quorum of players for a session before the session can begin. For example, if a game requires ten players, then a session might not start before ten players have joined, with the first nine players having to wait at least until a tenth player joins. In some cases, additional players can join during a session, such as up to a maximum number of players in some embodiments, while in others players may not be able to join, or may only be able to join if a current player leaves the session, etc.

In some embodiments, players may be added to game sessions in the order the requests are received or may be randomly assigned, among other such options. As mentioned, however, in other embodiments, there can be specific criteria used to select one or more players to join a game session. Traditional selection algorithms may rely on players selection based upon a current rank, rating, skill level, or other such metric associated with the player. As mentioned, this can be advantageous because a player can be matched with other players of similar skill level, such that the player does not feel that the game is too difficult or too easy, or just no fun, based on the skill of the other players. This is also advantageous, because as the player increases in skill then the players matched on the various game sessions will change to correspond to that skill level. A potential drawback to such an approach is that players may be matched with others whose behaviors are contrary to their own preferences (e.g., players who tend to use profanity when their preference is to not use profanity). Such selection approaches can take away from the social aspects of the games and interfere with player enjoyment.

Approaches in accordance with various embodiments can attempt to improve social and other aspects of multiplayer gaming by matching players in ways that enable players to more frequently play with players whose behaviors match their own preferences. Such approaches can help to facilitate friendships and communities within the game environment and the gaming community, as well as outside a game setting in at least some embodiments. Such approaches can build a sense of community amongst the gamers, which can improve the overall player experience and in turn power the success of the game itself.

Illustratively, each player of a game may be associated with a set of behaviors exhibited by the player. Behaviors may include, for example, tendency to use profanity or tendency towards certain playstyles (e.g., taking certain actions in game, playing in a certain manner, playing classes of a given type, etc.). In some embodiments, players may be associated with behaviors based on a monitoring of actions during play. For example, the game server 102 may detect that a player has undertaken a certain action (e.g., use of profanity, taking a certain action in game, etc.), and modify the behaviors associated with the player to reflect that action. In some embodiments, an administrator of the game server 102 (e.g., a developer of the game) may specify which behaviors should be monitored, what actions contribute to such behavior, and/or what effect a given action has on data indicative of behavior of the player (e.g., how many instances of profanity are required to mark the player as a user of profanity). Each player may further be associated with a set of preferences for the behaviors, which may be set on a per-player basis. For example, a first player may indicate a negative preference for profanity, but a neutral preference for certain in-game actions (such as leaving a session prior to completion). Another player may indicate a neutral preference for profanity, but a negative preference for the same in-game action.

When selecting players for inclusion in a game session, the game server 102 may consider the affinities of each player selected for inclusion. As used herein, the term affinity may be generally used to denote a compatibility of behaviors of a first player with preferences of a second player for those behaviors. Illustratively, a first player may be considered to have an affinity for a second player calculated based on an algorithm numerically representing the compatibility of preferences of the first player for the behaviors of the second player. In some embodiments, affinity of a first player to a second player may be calculated as a linear combination of the preferences of the first player for each behavior of the second player, as represented according to the calculation:

$$A(a,b)=\Sigma(p_{a1}*b_{b1}+p_{a2}*b_{b2}+\ldots p_{an}*b_{bn}) \quad (1)$$

where:
A is the affinity of a player a for a player b;
$p_{an}$ represents the preference of player a for behavior n (from a set of behaviors 1 . . . n), which may be represented as a number indicative of the strength of preference of the player for the behavior (e.g., on a scale from −1 to 1);
$b_{bn}$ represents a tendency of the player b to exhibit the behavior n, which may be represented as a number indicative of the tendency or frequency of the player to exhibit the behavior (e.g., on a scale from −1 to 1).

While the equation (1) applies the same weight to each preference, In some embodiments, different preferences are weighted differently (e.g., such that $p_{a1}$ is weighted twice as strongly as $p_{a2}$). In certain embodiments, the co-affinity between two players may be determined as a sum of the affinity of each player to each other, calculated according to the equation above (e.g., as the sum of A(a,b) and A(b, a)). In accordance with embodiments of the present disclosure, groups of players may be selected for invitation to a session based on a determination that each player within the prospective group has an affinity for each other player of the group above a threshold level (e.g., an absolute affinity of X, an average affinity for the other players of X, etc.). In some instances, affinities may be one of multiple criteria used to select players for inclusion within a group. Illustratively, inclusion within a group may be conditional based both on mutual affinities of over a threshold level and sharing a skill level within a threshold distance of other players within the group. In some instances, inclusion within a group may be based on multiple factors, such as mutual affinities, skill-levels, or histories of interactions between players. Illustrative mechanisms for group selection based on histories of interactions between players are provided, for example, within U.S. patent application Ser. No. 15/647,128, entitled "Social Player Selection for Multiplayer Electronic Games"

and filed Jul. 11, 2017, the entirety of which is incorporated by reference herein. As discussed in more detail below, histories of interactions may additionally or alternatively modify affinities between players.

In some embodiments, the game server 102 may utilize graph analysis to assist in selection of affinity-aware player selection. Illustratively, the game server 102 may generate a graph in which individual players are represented as nodes. Behaviors of each player, as well as preferences of the player for behaviors, can be represented as attributes of the node corresponding to the player. Edges between players may be weighted based on an affinity for the two players to which the edge connects. Illustratively, a directed edge (unidirectional from a first node to a second node) may indicate that an affinity of the player represented by a source node to a player represented by the destination node (e.g., as $A(a,b)$ according to equation (1) above). Undirected edges (or bidirection edges) may represent mutual affinities between the two players (e.g., as the sum of $A(a,b)$ and $A(b, a)$) according to equation (1) above).

Figure 2:
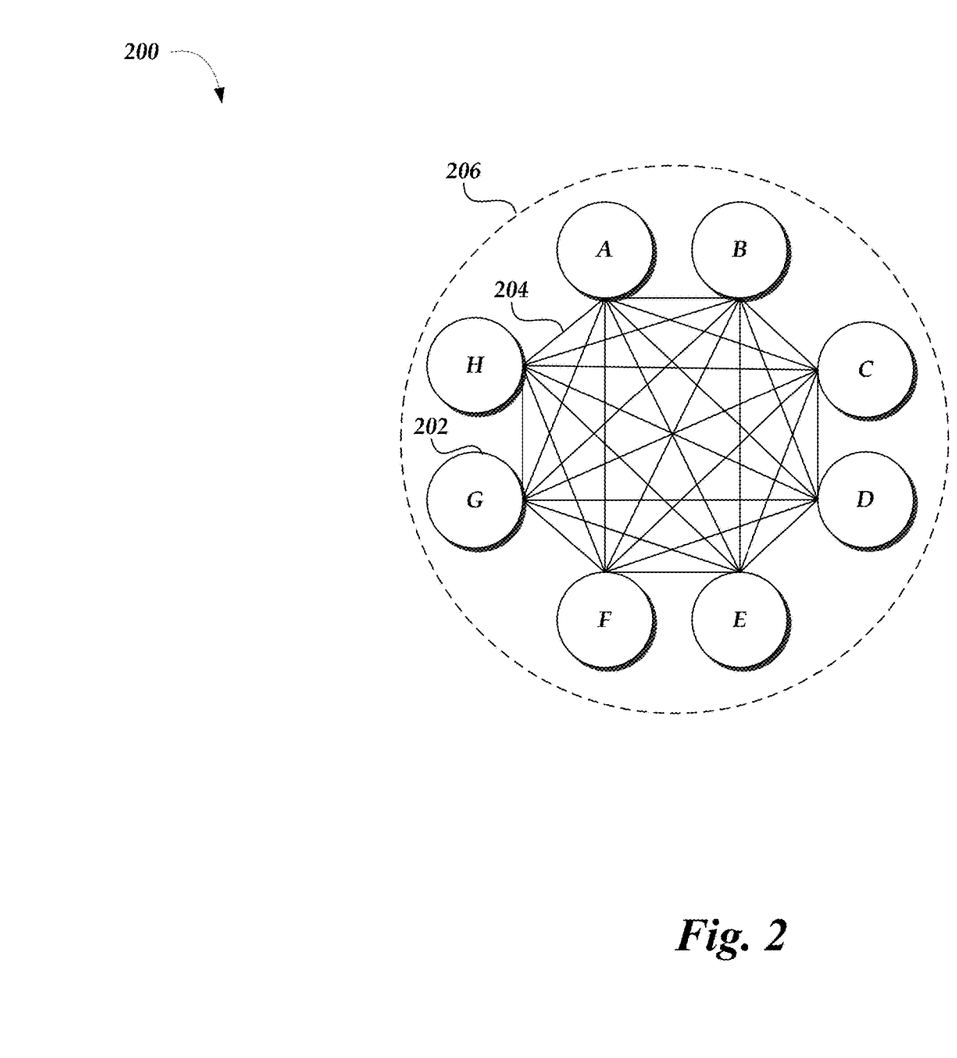
FIG. 2 illustrates an example graph that can be generated and utilized in accordance with embodiments of the present disclosure.

One illustrative example of such a graph is shown in FIG. 2. Specifically, FIG. 2 depicts a graph 200 for players A-H within a waiting player pool 206. The waiting player pool 206 may represent, for example, a set of players awaiting placement into a session of an electronic game. As shown in FIG. 2, players A-H are represented as nodes 202. Each node is connected to each other node by an edge 204. The weight of each node may be calculated according to equation (1) above, representing the mutual affinity of the two players represented by the nodes to which the edge connects. Illustratively, player A may have previously expressed a negative preference for a specific behavior (e.g., swearing) exhibited by player B. Player B may have previously expressed a positive preference for a behavior not expressed by Player A. Thus, the edge connecting node A to node B can be assigned a low weight. Conversely, player A may have previously expressed a positive preference for a behavior exhibit by player C. Player C may, in turn, have previously expressed a positive preference for a behavior exhibit by player A. Thus, the edge connecting node A to node C can be assigned a high weight. In some embodiments, preferences of players for behaviors are assigned explicitly by the player. In addition or alternatively, preferences of players for behaviors are assigned by the game server 102, such as based on presumed defaults or based on analysis of player-action in response to behavior. Illustratively, a player who tends to file complaints or to leave game sessions after experiencing specific behavior (e.g., use of profanity) may be assumed to have a negative preference for that behavior. Similarly, behaviors of players may be explicitly assigned or inferred from in-game actions. In some embodiments, natural language processing (NLP) or similar techniques, which are known in the art, may be applied to the embodiments described herein in order to facilitate recognition of player behaviors. In other embodiments, an administrator (such as a developer of a game) may specify in-game actions that constitute specific behavior. In certain embodiments, preferences and behaviors are further determined based on player association with one or more external systems, including non-game systems. For example, participation in a specific social networking site (or group on the social networking site) can be considered a behavior. In some embodiments, players associated with an external system are also assumed to have a preference for participation in the external system by other players.

In some embodiments, edges may further be weighted based on player-directed preferences. Illustratively, where player A has had a prior negative experience with player C, player A may "downvote" player C or otherwise indicate a dislike for player C. This player-directed preference may reduce the affinity of player A to player C, thus also decreasing the weight of the edge connecting the corresponding nodes. The specific modification to an affinity based on player-directed preferences may vary according to the type of player-directed preference. Illustratively, each "downvote" may reduce the affinity by a predetermined amount (e.g., in terms of percentage, absolute amount, etc.). A "ban" may reduce the affinity to zero or a negative value. In some instances, edges are weighted according to both affinity and other criteria, such as skill level, a history of interactions of players, or the like. These weights may be maintained separately or combined into a single weight value.

In the illustrative example of FIG. 2, it is assumed that spatial location within the graph is irrelevant, and each node is associated with each other node via an edge. However, in some embodiments, location within the graph may be utilized to represent additional information, such as player skill level. Illustratively, nodes may be located within a first dimension according to skill level, and edges may be calculated only for nodes falling within a threshold distance of one another. Additional criteria may be represented by additional dimensions of location. Thus, the location of nodes within FIG. 2 is illustrative in nature.

Figure 3:
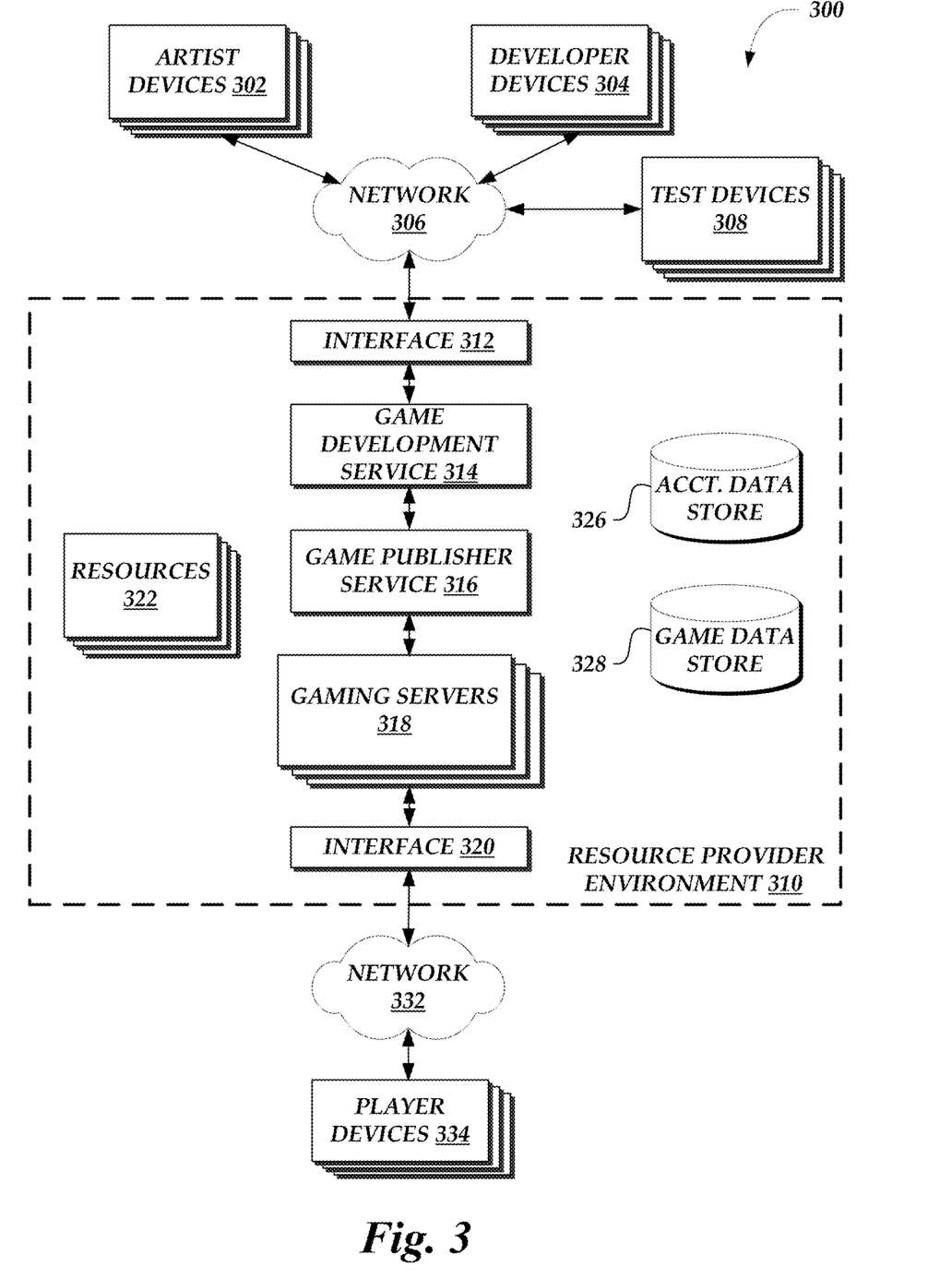
FIG. 3 illustrates an example environment in which players for a multiplayer gaming session may be selected in accordance with embodiments of the present disclosure.

As will be described below, a game server 102 may utilize the information within the graph 200 to facilitate selection of a group of players to join a session of an electronic game. While the information of FIG. 2 is described herein as a graph for illustrative purposes, embodiments of the present disclosure can be implemented without explicit enumeration of a graph. For example, data represented by FIG. 2 may instead be stored as one or more data tables or other such repositories. Each player can be assigned a player identifier, which can correspond to a row in at least one of the tables. The information for a given player may include behaviors of the player and preferences of the player (including, e.g., player-directed preferences), and may further include additional information, such as a list of all players with whom the player has played in previous sessions, some indication of the level or amount of common experience, a current skill or experience level, and indication of players who have been friended or blocked by that player, among other such options. These tables can then be consulted and cross-referenced against available players from the player pool when attempting to select players to invite, add, or select for a session FIG. 3 illustrates an example environment 300 in which aspects of the various embodiments can be implemented. In this example, users are able to utilize various devices 302, 304, and 334 to submit requests across at least one network 306 to a resource provider environment 310. The devices can include any appropriate electronic device operable to send and receive requests, messages, or other such information over an appropriate network and convey information back to a user of the device. Examples of such client devices include desktops, laptops or tablet computers, personal computers, wearable computers, servers, personal digital assistants (PDAs), hybrid PDA/mobile phones, mobile phones, electronic book readers, set-top boxes, voice command devices, cameras, digital media players, and the like.

The user device 302 and resource provider environment 310 may communicate via network 306, which may include any wired network, wireless network, or combination thereof. For example, the network 306 may be a personal area network, local area network, wide area network, over-the-air broadcast network (e.g., for radio or television), cable network, satellite network, cellular telephone network, or combination thereof. As a further example, the network 306 may be a publicly accessible network of linked networks, possibly operated by various distinct parties, such as the Internet. In some embodiments, the network 306 may be a private or semi-private network, such as a corporate or university intranet. The network 306 may include one or more wireless networks, such as a Global System for Mobile Communications (GSM) network, a Code Division Multiple Access (CDMA) network, a Long Term Evolution (LTE) network, or any other type of wireless network. The network 306 can use protocols and components for communicating via the Internet or any of the other aforementioned types of networks. Protocols and components for communicating via the Internet or any of the other aforementioned types of communication networks are well known to those skilled in the art and, thus, are not described in more detail herein.

The at least one network 306 can include any appropriate network, including an intranet, the Internet, a cellular network, a local area network (LAN), or any other such network or combination, and communication over the network can be enabled via wired and/or wireless connections. The resource environment 310 can include any appropriate components for receiving requests and returning information or performing actions in response to those requests. As an example, the service provider environment might include computing resources 322, such as Web servers and/or application servers for receiving and processing requests, then returning content or information in response to the request. The computing resources 322 can also include various repositories or data stores that can be allocated for use by, or on behalf of, various users, customers, or applications of the environment.

In various embodiments, the resource environment 310 may include various types of electronic resources that can be utilized by multiple users for a variety of different purposes. In at least some embodiments, all or a portion of a given resource, or set of resources, might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example, the provider environment includes a plurality of electronic resources 322 of one or more types. These types can include, for example, application servers operable to process instructions provided by a user or database servers operable to process data stored in one or more data stores in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a portion of the resources 322 can be allocated in response to receiving a request to an interface layer 312 of the resource environment 310. The interface layer can include application programming interfaces (APIs) or other exposed interfaces enabling a user to submit requests to the service provider environment. The interface layer 312 in this example can also include other components as well, such as at least one Web server, routing components, load balancers, and the like. When a request to provision a resource is received to the interface layer 312, information for the request can be directed to a resource manager or other such system, service, or component configured to manage user accounts and information, resource provisioning and usage, and other such aspects. A resource manager receiving the request can perform tasks such as to authenticate an identity of the user submitting the request, as well as to determine whether that user has an existing account with the resource provider, where the account data may be stored in at least one data store in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider, a key management service, a corporate entity, a certificate authority, an identify broker such as a SAML provider, and the like. In some embodiments, a user can provide information useful in obtaining the credentials, such as user identity, account information, password, user-specific cryptographic key, customer number, and the like. The identity provider can provide the credentials to the resource provider environment and/or to a client device, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device to communicate with an allocated resource without having to communicate with the resource manager, at least until such time as a relevant aspect of the user account changes, the user is no longer granted access to the resource, or another such aspect changes. The same or a different authentication method may be used for other tasks, such as for the use of cryptographic keys. In some embodiments, a key management system or service can be used to authenticate users and manage keys on behalf of those users. A key and/or certificate management service can maintain an inventory of all keys certificates issued as well as the user to which they were issued. Some regulations require stringent security and management of cryptographic keys which must be subject to audit or other such review. For cryptographic key pairs where both public and private verification parameters are generated, a user may be granted access to a public key while private keys are kept secure within the management service. A key management service can manage various security aspects, as may include authentication of users, generation of the keys, secure key exchange, and key management, among other such tasks.

A resource manager (or another such system or service) can also function as a virtual layer of hardware and software components that handles control functions in addition to management actions, as may include provisioning, scaling, replication, etc. The resource manager can utilize dedicated APIs in the interface layer 312, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 312 in at least one embodiment includes a scalable set of customer-facing servers that can provide the various APIs and return the appropriate responses based on the API specifications. The interface layer also can include at least one API service layer that, in some embodiments, consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

In this example, at least some of the resources are used to support platforms and services useful in the development and providing of electronic gaming and three-dimensional graphical content, among other such options. For example, artist devices 302 and developer devices 304 can collaborate via a game development service 314, which can be provided by a set of resources in the resource environment 310 that are able to scale dynamically as discussed above. It should be understood that artists fall within the group of people referred to herein as "developers," and that the distinction in this figure is to illustrate different types of users and purposes. Unless otherwise specifically stated, developers can include not only code developers, but also artists, game designers, engineers, quality assurance personnel, content creators, musicians, and the like. The game development service can perform tasks such as to enable the checking out or locking of items for a game, the management of game files amongst developers, the providing of tools or templates to use for gaming development, and the like. The development service 314 can also provide communication services such as messaging and content sharing, among other such options. The game development service 314 can store information for a game to at least one game data store 328, where the repositories can include graphics files, code, audio files, and the like. The game development service 314 can also work with an account manager, or maintain information in an account data store 326, such that the game development service can determine which resources, including amounts or types of resources, can be allocated on a customer's behalf for the development of one or more customer games or other such content. The account data can also specify which users are authorized to work on the gaming content, including types of content accessible, actions able to be taken, and the like.

Once the game development reaches an appropriate stage in the development cycle or pipeline, as may relate to alpha or beta testing, actual release or updating, etc., the appropriate content can be made accessible to a game publisher service 316. The game publisher service 316 can receive instructions regarding the type of release, format of the release, and other appropriate information, and can cause the game content to be published to an appropriate location for access. While illustrated as part of the service provider environment, it should be understood that components such as the gaming servers or game publisher could be executed on a local user machine as well, whether one of the developer machines 304 or otherwise. In some embodiments, the game content might be published and made available to one or more test devices 308, which may be associated with the customer, such that the customer can test various builds or versions of the game. In some embodiments, feedback provided by the test devices 308 may be provided to the game development service 314, which can maintain testing feedback or data and make that feedback available, via logs, messages, reports, or other such mechanisms, to the developers or other persons associated with the game development. If the game is to be made available to end users, gamers, or other such persons or entities, the game publisher service might publish the game content to an array of gaming servers 318 which can run the game and enable player devices 334 to access the game content over one or more networks 332. Network 332 may correspond to any of the types of networks described above with respect to network 306. In some embodiments, network 332 and network 306 are the same network. In another embodiment, network 332 and network 306 are different networks. This can include, for example, dedicated gaming networks, the Internet, cellular networks, and the like. The player devices 334 can communicate with the appropriate interfaces of an interface layer 320 to obtain the gaming content. In some embodiments, the player devices 332 will download the gaming content for execution on the individual machines, and will upload (or otherwise communicate) gaming data, messages, and other information to the gaming servers 318, as well as to other players, social networking sites, or other such recipients. The gaming servers 318 can cause state information for the various instances of the game to be stored to at least one game state repository. This can hold state for the game as a whole or for individual game sessions, among other such options. In some embodiments, the game content can be executed by the game servers 318 and streamed in near real time to the player devices 334. In some embodiments, there may alternatively be a mix of gaming content executed on the player devices 334 and the gaming servers 318. Peer-to-peer connections among the player devices 334 and other communications can be utilized as well in various embodiments.

Figure 4:
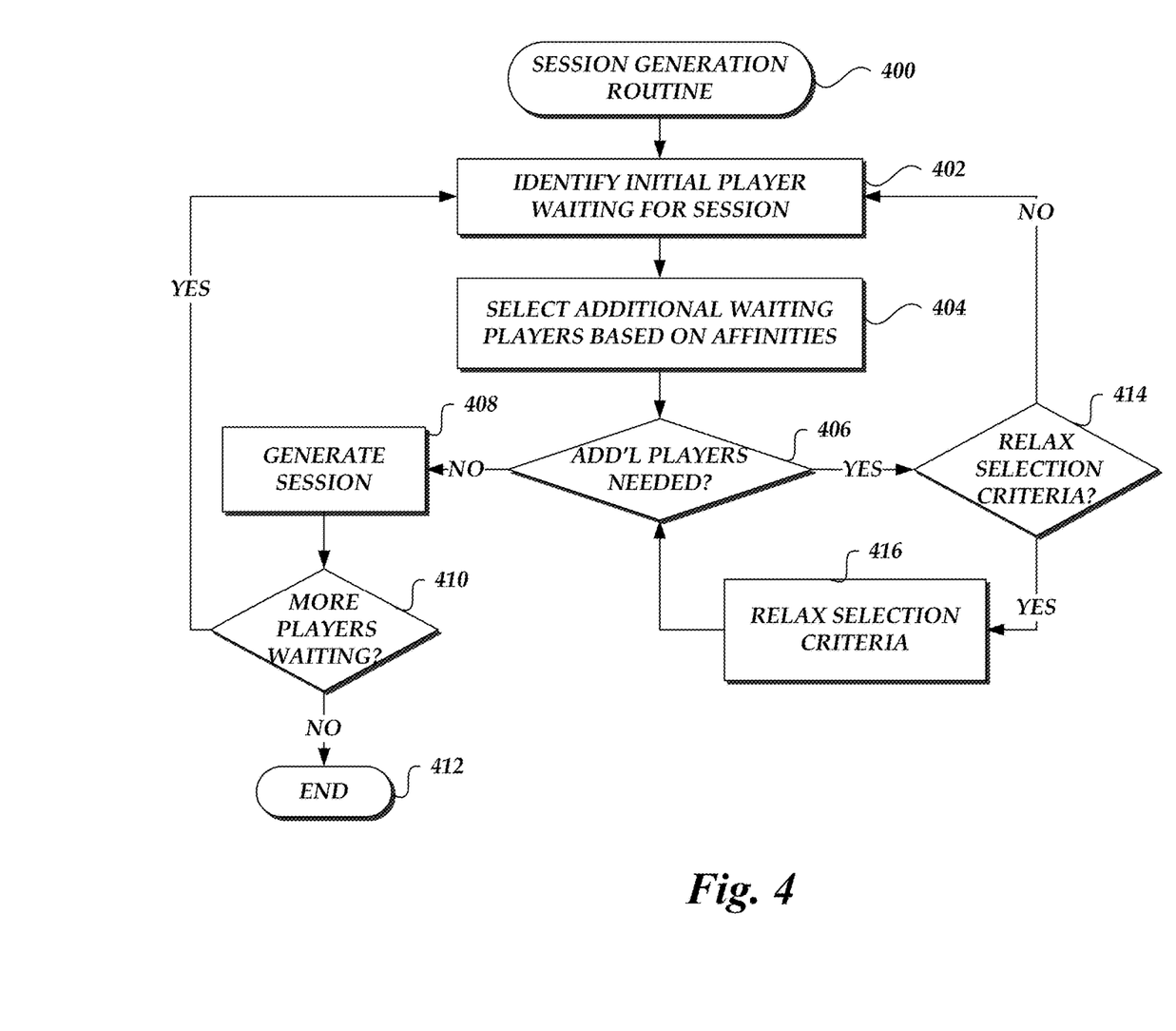
FIG. 4 depicts an illustrative routine for selecting players for inclusion in a multiplayer gaming session based on compatibilities of player behaviors to preferences of players for those behaviors in accordance with embodiments of the present disclosure.

FIG. 4 depicts an illustrative routine 400 that may be implemented by a gaming server 318 in order to populate a session of an electronic game. Illustratively, a session may comprise a "match" or other instance of the game, whereby multiple players (utilizing one or more player devices 334) interact with one another. In accordance with embodiments of the present disclosure, the gaming server 318 may select players for inclusion in a session based at least partly on preferences of the players for behaviors exhibited by other players, as a sole criteria or in combination with other criteria (such as skill level, history of shared play, or the like).

The routine 400 illustratively begins at block 402, where the gaming server 318 identifies a player (e.g., signed into the gaming server 318 from a player device 334) awaiting inclusion into a game session. The player may illustratively be selected from a pool of players awaiting inclusion into a game session. In some embodiments, the player initially selected at block 402 is selected at random from the pool of players. In other embodiments, the player is selected according to a queue, such as a first-in-first-out queue of players.

At block 404, the gaming server 318 selects one or more additional players from the pool of players awaiting inclusion into the game. In some embodiment, selection of a player is conditioned on an affinity of the initial player to the additional player of at least a threshold value (e.g., according to equation (1), above). In another embodiment, selection of a player is condition on a mutual affinity (e.g., as the sum of A(a,b) and A(b, a) according to the equation (1), above) between the initial player and the additional player of at least a threshold value. In yet another embodiment, selection of a player is condition on mutual affinities between every pair of selected players of at least a threshold value. The threshold value may be set, for example, by a developer of the game or by an administrator of the game server. In some instances, the threshold value is absolute. In other instances, the threshold value varies based on the current pool of players (e.g., as an average of the mutual affinities between all pairs of players, as an minimum affinity needed to pair the initial player with a sufficient number of additional players, etc.). In some embodiments, affinities between players may be combined with other criteria, such as requisite skill level or common playing time, in order to select players. Affinity and other criteria may be independent, such that threshold values of each must be satisfied to enable inclusion in a group. Affinity and other criteria may alternatively be dependent, such that sufficient affinity enables inclusion in a group even if other criteria are not satisfied, or vice versa. As will be discussed below, a graph of players within the pool of players can in some instances be used to facilitate implementation of block 402. Implementation of block 402 may include selection of any number of players. In some embodiments, selection of additional players continues until a minimum number of players needed to begin a game session is reached. In another embodiment, selection of additional players continues until a maximum number of players allowed within the game session is reached.

At block 406, the gaming server 318 determines whether additional players are required. For example, where the players selected at block 404 does not meet a minimum number of players needed to begin a game session, block 406 may evaluate as false. In such an instance, the routine 400 continues to block 414, where it is determined whether criteria for selection of additional players may be relaxed. In some embodiments, multiple levels of threshold values (e.g., for required mutual affinity, for required skill level, etc.) may be established by a developer or administrator, in order to cause the routine 400 to initially attempt to group players according to most preferable criteria, but to fall back on less preferable criteria when an insufficient number or arrangement of players within the pool exist to enable creation of a session. Thus, implementation of block 414 may include determining whether such less preferable criteria exist. In another embodiment, specific player criteria can be relaxed to enable selection of additional players. Illustratively, where a player has a very strong preference for a specific behavior that is uncommon among other players of the pool, that preference may be de-weighted (e.g., within equation (1), above) to decrease the relative importance of that preference to affinity scores of the player. In some embodiments, a player can identify preferences eligible for de-weighting. In another embodiment, the gaming server 318 automatically selects preferences for de-weighting based on a relative effect of the preference on the overall affinity score (e.g., by identifying preferences that result in component values diverging greatly from other component values within equation (1)). Thus, implementation of block 414 may include determining whether any preference of a player currently selected (e.g., the initial player or additional players) may be relaxed in order to enable selection of additional players. In some instances, implementation of block 414 may include time-based criteria. For example, the gaming server 318 may determine that a specific type of relaxation of selection criteria may only occur once the initial player or other players selected at block 414 have been waiting for inclusion in a gaming session for at least a threshold period of time.

If block 414 evaluates as true, the routine 400 continues to block 416, where the selection criteria are relaxed in accordance with the disclosure above. The routine 400 then returns to block 406. If block 414 evaluates as false, the routine 400 returns to block 402, where an alternative player is selected at block 402. In some embodiments, the player previously selected as the initial player is moved back in the selection queue (e.g., to the back of the queue, to a second slot in the queue, etc.), such that they may be later selected again at block 402, potentially when additional players have joined the pool.

The routine 400 then continues as described above until it again arrives at block 406. When block 406 evaluates as true, the routine 400 continues to block 408, where a gaming session is initiated with the initial player and the players selected at block 404. Illustratively, the gaming server 318 may transmit to each relevant player device 334 an invitation to join the game session. Each accepting player may then be placed into the game session. In some embodiments, because each player within the session has an affinity to each other player of at least a threshold amount, the enjoyment of the players within the session is likely to be increased, thereby increasing utility of the gaming server 318 and avoiding deficiencies of prior techniques.

Thereafter, the routine 400 proceeds to block 410, where the gaming server 318 determines whether additional players are awaiting placement in a gaming session. If so, the routine 400 returns to block 402, as described above. Otherwise, the routine 400 may end at block 412.

One skilled in the art will appreciate, in accordance with the present disclosure, that the routine 400 as described above is illustrative in nature. In some embodiments, the gaming server 318 varies implementation of the routine 400 to further enhance selection of players within a gaming session.

Illustratively, the gaming server 318 may modify implementation of block 404 to avoid potentially undesirable effects, such as consistently pairing a player with a specific set of other players. Such modification may include, for example, separate implementation of the routine 400 for each team within a team-based game session. By separately considering affinities of players of different teams, players on a given team may be likely to share strong affinities for one another, but may be less likely to consistently see the same players on other teams. Another such modification may include incorporation of random selection within block 404. For example, where the gaming server 318 attempts to select n additional players for inclusion in a game session, the gaming server 318 may first, at block 404, select n+m players that satisfy selection criteria, and thereafter select the n players from the larger set at random. Such random selection may reduce the tendency of similar players to always be grouped together, while still ensuring sufficient affinities exist between players selected for inclusion in a game session.

Other potential undesirable effects may occur with specific configurations of player preferences and behaviors. For example, when two players both exhibit a certain behavior and express a negative preference for that behavior (a "hypocritical" behavior), the two players are unlikely to be grouped together based on a mutual affinity value. Instead, each player is more likely to be grouped with either players who exhibit the behavior but have no negative preference for it, or players who have a negative preference for a behavior but do not exhibit the behavior. Either outcome may be considered undesirable, as the former may normalize potentially undesirable behavior, while the later leads to players experiencing behaviors they have a negative preference for. To address such instances, the gaming server 318 may In some embodiments, de-weight preferences of a player for behaviors exhibited by that player. The amount of de-weighting may be established, for example, by a developer of the game or an administrator of the gaming server 318. The amount of de-weighting may be selected, for example, based on an expected effect of the de-weighting. Illustratively, a high de-weighting may cause players with hypocritical preferences to be more likely to be matched with one another, isolating those players from other players. A low de-weighting may cause players with hypocritical preferences to be more likely to be matched with players that do not exhibit the undesirable behavior, but have no strong preferences with regard to that behavior. This may, for example, lead the players with hypocritical preferences to modify their behavior to match the social norm. In some embodiments, this de-weighting may occur only for specific behaviors, such as those designated by the developer of game administrator, which may correspond to undesirable behaviors. For example, de-weighting may be applied to a hypocritical tendency to use profanity or to act maliciously in a game session. However, de-weighting may not be applied to other behaviors that may appear hypocritical, but are in fact not. For example, in a game supporting multiple different character classes (e.g., that form teams of varying abilities), de-weighting might not be applied when a player tends to play a first class, but prefer other players not to play that class. Thus, description of the routine 400 above is intended to be illustrative in nature.

Figure 5:
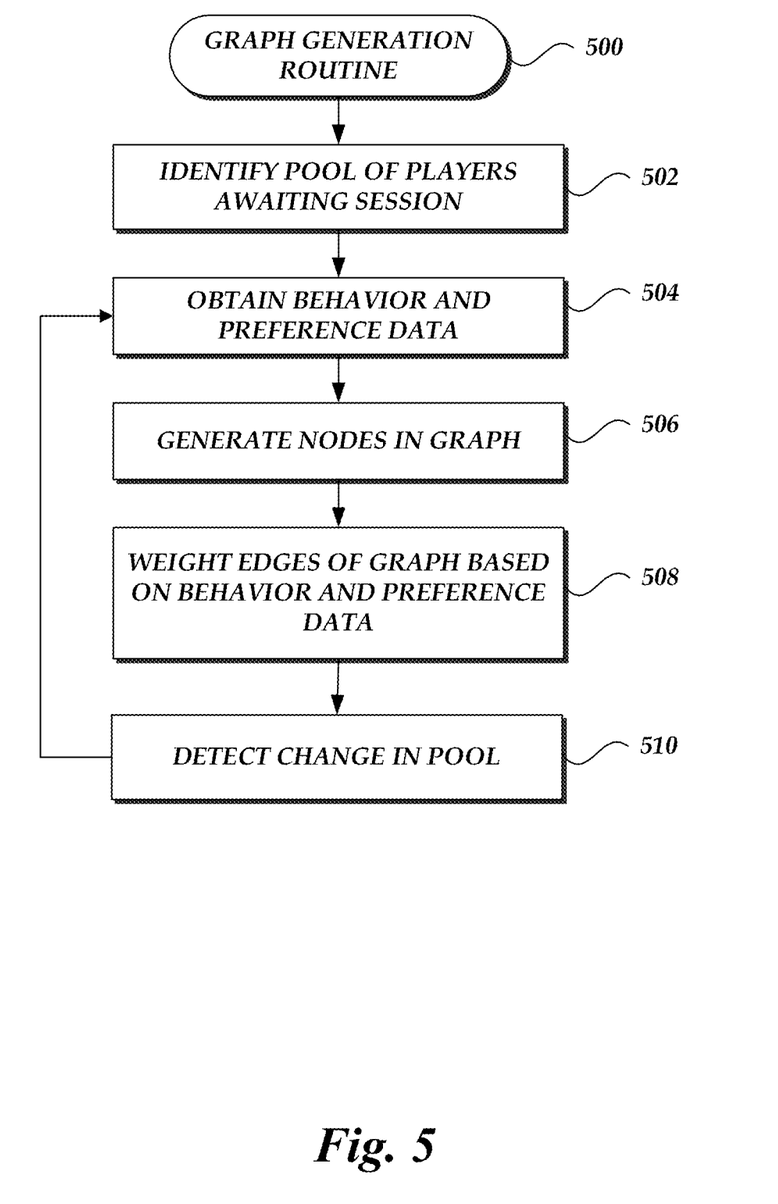
FIG. 5 depicts an illustrative routine for generating a graph representing players, as well as behavior to preference compatibilities of those players, for use in embodiments of the present disclosure.

In some embodiments, the gaming server 318 uses graph analysis to aid in selection of players to join a game session (e.g., during implementation of block 404 of the routine 400, described above). Specifically, the gaming server 318 may generate a graph, such as the graph 200 of FIG. 2, representing a pool of players awaiting entry into a game session as nodes, and representing affinities between those players as edges. One illustrative routine 500 for generating such a graph is shown in FIG. 5.

The routine 500 begins at block 502, where the gaming server 318 identifies a pool of players awaiting inclusion in a game session. The players may be identified, for example, based on requests from player devices 334. At block 504, the gaming server 318 obtains behavior and preference data for the players identified at block 504. As discussed above, either or both behavior and preference data may be explicitly designated by players (e.g., through controls enabling updates to account information). Additionally or alternatively, behavior or preference data may be inferred by the gaming server 318 based on player action. For example, a tendency of a player to take an action within a game may increase a value of a corresponding behavior with respect to that player. Mappings of actions to behaviors may be designated, for example, by a developer of a game or an administrator of the gaming server 318. As a further example, a tendency of a player to provide feedback in response to other player's actions may modify a preference for behaviors corresponding to those actions. Illustratively, the gaming server 318 may assume that a player has a negative preference for a behavior when that player "downvotes" another player in response to an action mapped to the behavior. In some instances, voice recognition or NLP techniques may be utilized to assist in identification of specific actions, such as recognition of use of profanity. Mappings of feedback to preferences may be designated, for example, by a developer of a game or an administrator of the gaming server 318. In some embodiments, the gaming server 318 also retrieves additional information regarding the players, such as skill level metrics, shared histories of play, and the like.

At block 506, the gaming server 318 generates nodes within the graph for those players within the waiting player pool. As noted above, each node may represent a player within the pool, and be associated with the behavior and preference data of that player.

At block 508, the gaming server 318 generates and weights edges between the nodes. In some embodiments, each edge between two nodes is weighted based on a compatibility of preferences of individual players represented by the nodes to which the edge connects and the behaviors exhibited by those nodes. For example, each edge may be weighted according to a mutual affinity of the players represented by the nodes (e.g., as the sum of A(a,b) and A(b, a) according to equation (1), above). In some embodiments, nodes are generated without regard to location, and edges are created between every pair of nodes. In other embodiments, nodes are located within the graph based on a metric, such as player skill level. In these other embodiments, edges may be created, at least initially, only between players within a threshold distance of one another.

As discussed above, the weighted graph may thereafter be used to select a set of players to join a gaming session, such that the selected players have mutual affinities for one another. Illustratively, after selecting an initial player (e.g., at block 402 of the routine 400), the gaming server 318 may locate the node of the initial player within the graph, and then traverse according to the weighted edges to locate additional nodes representing additional players (e.g., at block 404 of the routine 400). Illustratively, the gaming server 318 may be configured to traverse the graph along only edges of a threshold weight (e.g., representing a threshold affinity to the initial player). In some embodiments, the gaming server 318 is configured to traverse the graph to locate network of nodes all interconnected with edges of the threshold weight. The gaming server 318 may then select players corresponding to each additional identified node as players to join a gaming session.

In some embodiments, routine 500 is continuously implemented by the gaming server 318 during operation. Thus, the routine 500 continues to block 510 when a change within the pool (e.g., addition or removal of players) is detected. The routine 500 then returns to block 504, as discussed above. The graph may then be continuously updated to reflect current players within the waiting player pool.

Figure 6:
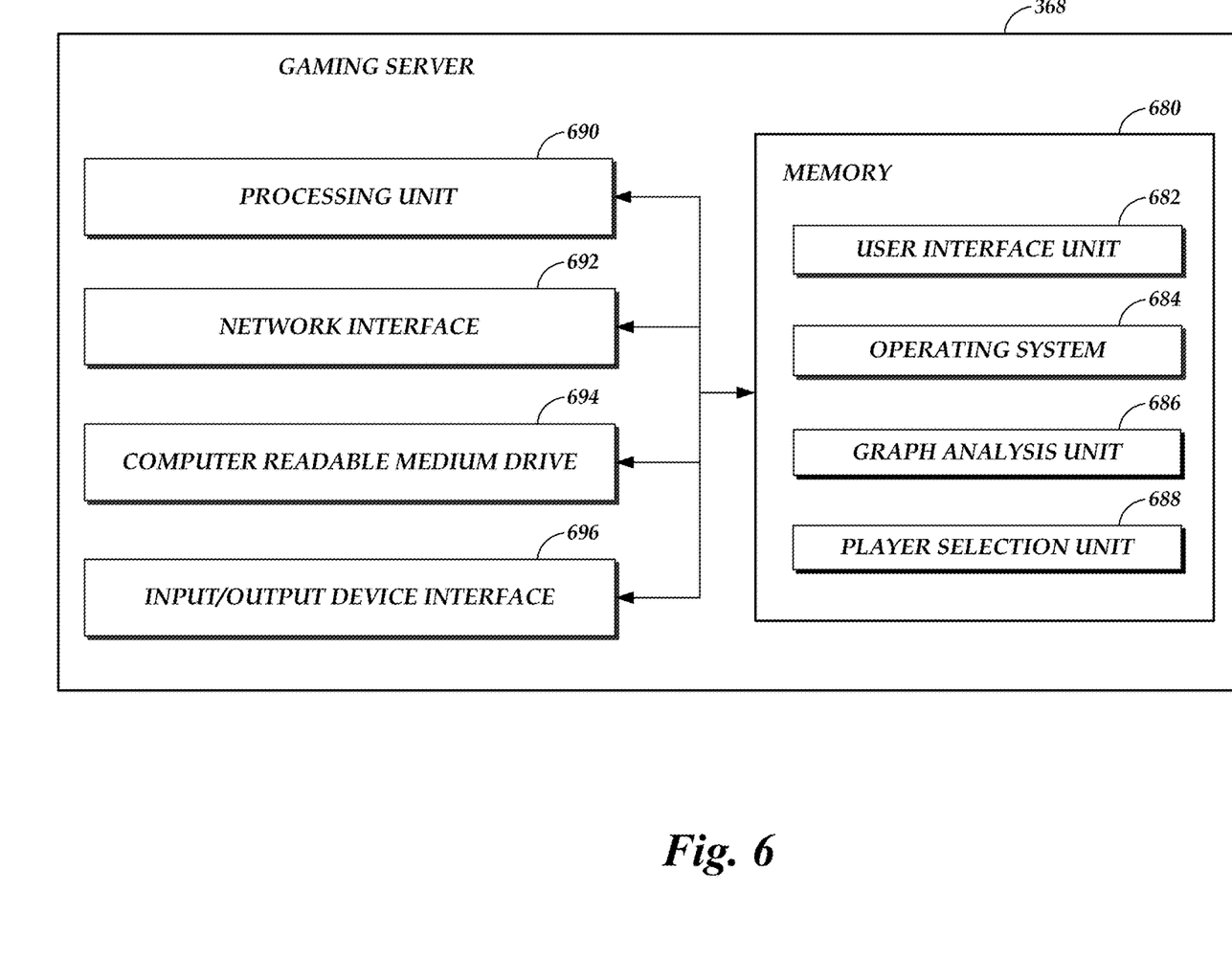
FIG. 6 depicts an illustrative configuration of a computing device that can be used to implement at least some aspects of embodiments of the present disclosure.

FIG. 6 depicts a general architecture of a computing system (referenced as gaming server 318) that manages gaming sessions, as well as selection of players to be included within such session. The general architecture of the gaming server 318 depicted in FIG. 6 includes an arrangement of computer hardware and software modules that may be used to implement aspects of the present disclosure. The hardware modules may be implemented with physical electronic devices, as discussed in greater detail below. The gaming server 318 may include many more (or fewer) elements than those shown in FIG. 6. It is not necessary, however, that all of these generally conventional elements be shown in order to provide an enabling disclosure. Additionally, the general architecture illustrated in FIG. 6 may be used to implement one or more of the other components illustrated in FIG. 3. As illustrated, the gaming server 318 includes a processing unit 690, a network interface 692, a computer readable medium drive 694, and an input/output device interface 696, all of which may communicate with one another by way of a communication bus. The network interface 692 may provide connectivity to one or more networks or computing systems. The processing unit 690 may thus receive information and instructions from other computing systems or services via a network. The processing unit 690 may also communicate to and from memory 680 and further provide output information for an optional display (not shown) via the input/output device interface 696. The input/output device interface 696 may also accept input from an optional input device (not shown).

The memory 680 may contain computer program instructions (grouped as modules in some embodiments) that the processing unit 690 executes in order to implement one or more aspects of the present disclosure. The memory 680 generally includes random access memory (RAM), read only memory (ROM) and/or other persistent, auxiliary or non-transitory computer readable media. The memory 680 may store an operating system 684 that provides computer program instructions for use by the processing unit 690 in the general administration and operation of the worker manager 640. The memory 680 may further include computer program instructions and other information for implementing aspects of the present disclosure. For example, in some embodiments, the memory 680 includes a user interface unit 682 that generates user interfaces (and/or instructions therefor) for display upon a computing device, e.g., via a navigation and/or browsing interface such as a browser or application installed on the computing device. In addition, the memory 680 may include and/or communicate with one or more data repositories (not shown), for example, to access user program codes and/or libraries.

In addition to and/or in combination with the user interface unit 682, the memory 680 may include a graph analysis unit 686 and a player selection unit 688 that may be executed by the processing unit 690. In some embodiments, the graph analysis unit 686 and a player selection unit 688 individually or collectively implement various aspects of the present disclosure, e.g., selection of players to be included within a gaming session based on compatibilities between player behaviors and preferences for such behaviors, generation and use of a graph to facilitate such selection, etc., as described above.

While the graph analysis unit 686 and player selection unit 688 are shown in FIG. 6 as part of the gaming server 318, in other embodiments, all or a portion of the instance graph analysis unit 686 and a player selection unit 688 may be implemented by other components of the resource provider environment 310 and/or another computing device. For example, in certain embodiments of the present disclosure, another computing device in communication with the on resource provider environment 310 may include several modules or components that operate similarly to the modules and components illustrated as part of the gaming server 318.

In some embodiments, the gaming server 318 may further include components other than those illustrated in FIG. 6. For example, the memory 680 may further include an elements or components for generating and facilitating gaming sessions on player devices 334.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
a physical data store comprising data regarding a set of players of an electronic game, wherein the data comprises, for each player of the set of players, data indicative of a set of behaviors of the player and data indicative of a set of preferences of the player for behaviors from the set of behaviors; and
a processor configured to execute instructions that, when executed, cause the processor to:
determine that the set of players are awaiting initiation of a session of the electronic game;
generate a graph for the set of players, the graph representing individual players from the set of players as nodes;
populate the graph with edges between at least nodes representing a subset of the set of players, wherein each edge is weighted according to a compatibility of the sets of preferences of players represented by nodes to which the edge connects to the sets of behaviors for the players represented by the nodes to which the edge connects;
determine that weights of the edges between the nodes representing the subset of players satisfy a threshold value; and
initiate the session of the electronic game including the subset of players;
wherein the compatibility of the sets of preferences of players represented by nodes to which the edge connects to the sets of behaviors for the players represented by the nodes to which the edge connects is determined based at least in part on the equation:

$$A(a,b)=\Sigma(p_{a1}*b_{b1}+p_{a2}*b_{b2}+\ldots p_{an}*b_{bn})$$

where:
A is the compatibility of the set of preferences of a player a, from the subset of players, to the set of behaviors for a player b from the subset of players;
$b_{bn}$ represents an nth behavior from the set of behaviors of the player b; and
$p_{an}$ represents an nth preference, from the set of preferences of player a, for the nth behavior of player b.

2. The system of claim 1, wherein at least one edge of the graph is further weighted according to a preference of a first player represented by a first node to which the edge connects for a second player represented by a second node to which the edge connects.

3. The system of claim 1, wherein the instructions further cause the processor to:
monitor an action of a first player, from the set of players, within the session; and
modify the set of behaviors for the first player based at least partly on the action.

4. The system of claim 3, wherein modifying the set of behaviors for the first player based at least partly on the action comprises obtaining a mapping of the action to a behavior from the set of behaviors.

5. A computer-implemented method comprising:
receiving, on behalf of a first player, a request to initiate a session for an electronic game;
matching the first player to a second player of the electronic game based at least partly on a preference of the first player for a behavior of the second player, wherein matching the first player to the second player of the electronic game based at least partly, on the preference of the first player for the behavior of the second player comprises generating a graph representing the first and second players as nodes, the graph including an edge weighted according to at least the preference of the first player for the behavior of the second player; and
initiating a session of the electronic game including the first player and the second player;
wherein:
the preference corresponds to a plurality of preferences;
the behavior corresponds to a plurality of behaviors; and
the preference of the first player for the behavior of the second player is quantified based at least partly on a linear combination of a compatibility of each preference, from the plurality of preferences with a corresponding behavior from the plurality of behaviors.

6. The computer-implemented method of claim 5 further comprising determining the behavior of the second player based on analysis of a history of actions taken by the second player.

7. The computer-implemented method of claim 6, wherein the analysis includes at least application of a natural language processing technique to words submitted by the second player to detect use of profanity by the second player.

8. The computer-implemented method of claim 5, wherein the plurality of behaviors of the second player include participation in a social networking system.

9. The computer-implemented method of claim 5, wherein the compatibility of each preference, from the plurality of preferences, with the corresponding behavior from the plurality of behaviors is weighted within the linear combination.

10. The computer-implemented method of claim 9, wherein weights applied to each compatibility are player-specified.

11. Non-transitory computer-readable media comprising instructions that, when executed by a computing, cause the computing system to:
receive, on behalf of a first player, a request to initiate a session for an electronic game;
generate a graph representing the first player and a second player as nodes, the graph including an edge between the nodes representing the first and second players weighted according to at least a preference of the first player for a behavior of the second player;
match the first player to the second player of the electronic game based at least partly on analysis of the graph; and
initiate a session of the electronic game including the first player and the second player;
wherein:
the preference corresponds to a plurality of preferences;
the behavior corresponds to a plurality of behaviors; and
the preference of the first player for the behavior of the second player is quantified based at least partly on a linear combination of a compatibility of each preference, from the plurality of preferences, with a corresponding behavior from the plurality of behaviors.

12. The non-transitory computer-readable media of claim 11, wherein the graph further includes nodes representing a plurality of players awaiting a session for the electronic game.

13. The non-transitory computer-readable media of claim 12, wherein nodes within the graph are located based at least partly on a skill metric of a player represented by the node.

14. The non-transitory computer-readable media of claim 11, wherein the analysis of the graph includes at least traversing the graph to determine that the edge between the nodes representing the first and second players is weighted by at least a threshold value.

15. The non-transitory computer-readable media of claim 11, wherein matching the first player to the second player is further based at least partly on a preference of the first player for the second player.

* * * * *

UNITED STATES PATENT AND TRADEMARK OFFICE
CERTIFICATE OF CORRECTION

PATENT NO.         : 10,807,006 B1
APPLICATION NO.    : 15/833903
DATED              : October 20, 2020
INVENTOR(S)        : Joshua Ryan Davis Page 1 of 1

It is certified that error appears in the above-identified patent and that said Letters Patent is hereby corrected as shown below:

In the Specification

Column 5, Line 19, delete "a))" and insert --a)--.

Column 6, Line 49, delete "session" and insert --session.--.

In the Claims

Column 18, Line 10, Claim 5, delete "partly," and insert --partly--.

Column 18, Line 25, Claim 5, delete "preferences" and insert --preferences,--.

Column 18, Line 48, Claim 11, delete "computing," and insert --computing system,--.

Signed and Sealed this
Twenty-ninth Day of December, 2020

Andrei Iancu
*Director of the United States Patent and Trademark Office*